Sept. 17, 1929.   J. F. SCHWEIGER   1,728,308
FASTENING FOR ARTIFICIAL LIMBS
Filed Feb. 4, 1928
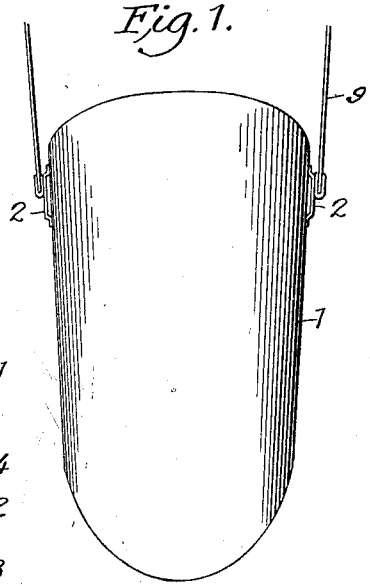
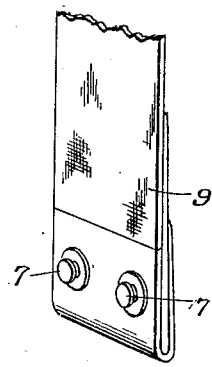
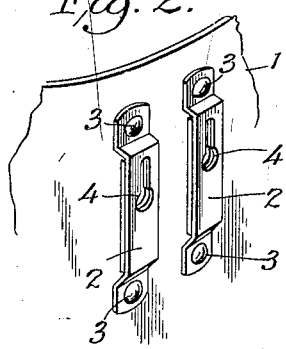
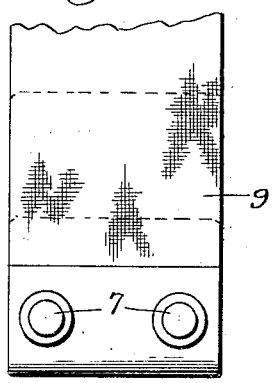
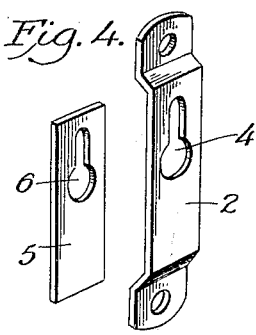
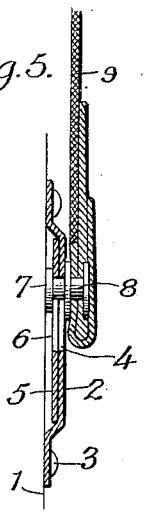
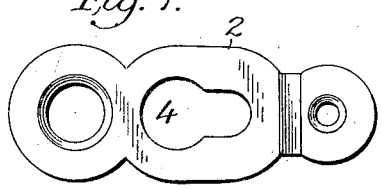
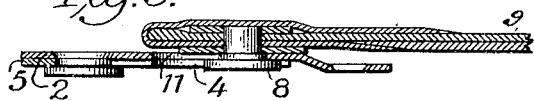
J. F. Schweiger, INVENTOR,
BY
ATTORNEY.

Patented Sept. 17, 1929

1,728,308

UNITED STATES PATENT OFFICE

JOHN F. SCHWEIGER, OF FLORA, INDIANA

FASTENING FOR ARTIFICIAL LIMBS

Application filed February 4, 1928. Serial No. 251,814.

My invention relates to improvements in fasteners for artificial limbs, and the main object of my invention is the provision of a fastener of the most simple, durable and inexpensive construction which will permit the instant connection or release of the limb and which will provide an absolutely reliable fastening to prevent improper release of the fastener.

Another object of my invention is the provision of a fastener which will occupy a very small space to adapt it for the purpose intended, which will allow proper movement of the limb under all conditions and which will be thoroughly efficient and practical in every particular.

To attain the desired objects my invention consists of a fastener of the character described embodying novel features of construction and combination of parts substantially as described and claimed and as shown in the accompanying drawings, in which:

Figure 1 represents a view in elevation of a part of an artificial limb with my fastener applied.

Figure 2 represents a perspective view on an enlarged scale of the twin fastening members used in my device and arranged on each side of the limb.

Figure 3 represents a perspective view of one of the supporting straps with the twin hooks or studs which cooperate with the fastening members.

Figure 4 represents a perspective view of the parts which comprise each of the twin fastening members.

Figure 5 represents a sectional view with the parts in fastened position, and

Figure 6 represents an elevation of one of the supporting straps with fastening studs or hooks.

Figures 7, 8 and 9 are detail views of a modified and preferred form of my invention.

I have shown my fastening device as applied to artificial limbs but I would have it understood that I do not limit it to such use but reserve the right to use the fastening for any purpose where it would perform its function in a practical manner, and in accordance with my invention as shown, the numeral 1 designates a part of an artificial limb of any desired construction, to each side of which and in diametric relation is secured the pair of raised vertically disposed plates 2, which are rigidly secured by fastenings 3 in parallel relation, and are provided with vertical bayonet slots 4, and in rear of said plates is secured or retained the plates 5, which also have registering similar bayonet slots 6, the opening provided by said slots being adapted to receive the headed studs 7, which are disposed in twin relation and secured by their pair of heads 8, to the suspending straps 9.

From this construction it will be observed that the fastenings are attached to each side in diametric relation of the limb and provide a pair of bayonet slots which receive the studs on the suspending straps and clamp the studs in position with reference to the twin vertical plates, and which while allowing proper movement of the parts provide a fastening means which cannot possibly work loose or become detached, but which permits instant application or release of the fastening when found necessary.

In Figures 7, 8 and 9 I have shown a form of my invention which is somewhat modified and which is the most perfect and preferred form of my invention, but the construction is practically identical in structure and operation, except that the plate 5, is provided with an opening 10, and with the pair of openings 11, of similar shape connected by slot 12, and has the free passage 13, but generically the device is the same in all figures.

I claim:

The combination with an artificial limb, a pair of parallel vertically disposed female locking members secured in diametric relation on each side of said limb, each of said members composed of two slotted plates, a pair of studs carried by a pair of suspending straps, said studs adapted to engage and lock in said slotted plates for fastening said limb.

In testimony whereof I hereunto affix my signature.

JOHN F. SCHWEIGER.